J. MEIER & J. F. WALLACE.
COTTON HARVESTING AND CLEANING MACHINE.
APPLICATION FILED OCT. 3, 1916.
1,239,614.
Patented Sept. 11, 1917.
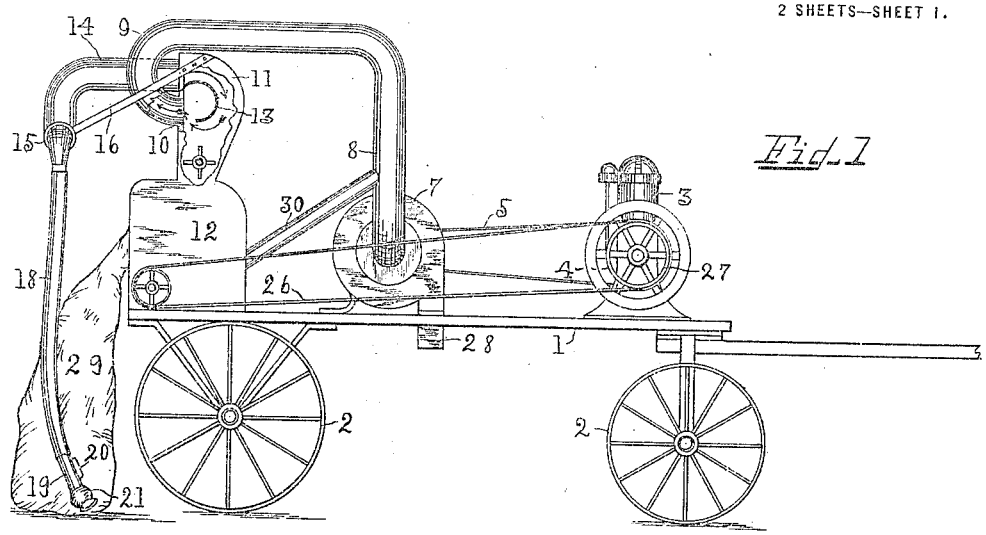
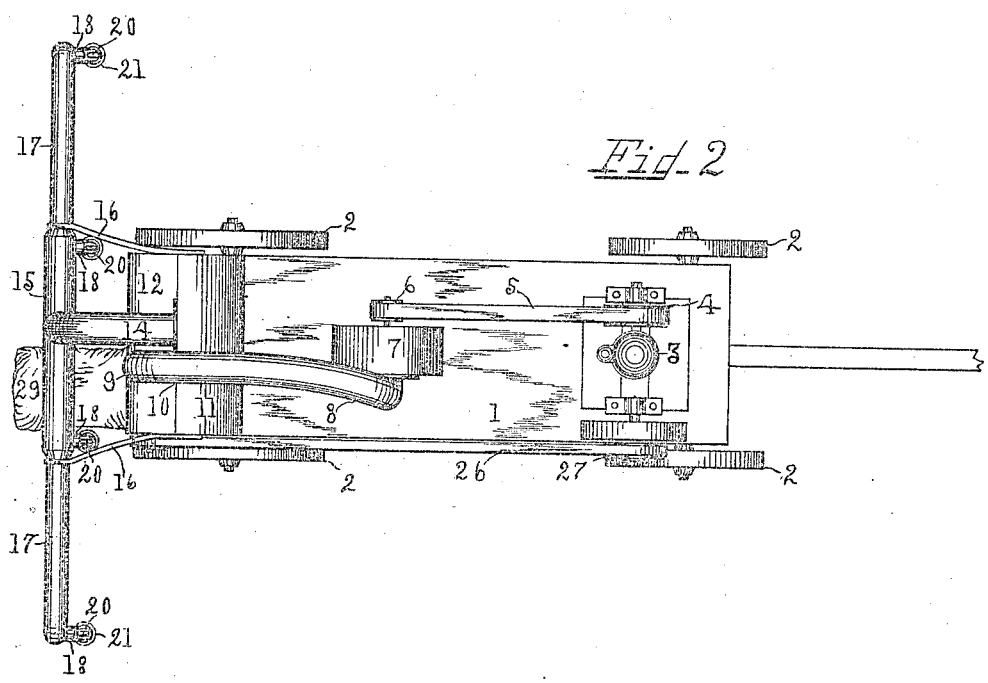
Witnesses.
W. U. Jean
Elda Luesley
Inventors.
John Meier.
James F. Wallace.
By J. P. Dederick.
Attorney.

J. MEIER & J. F. WALLACE.
COTTON HARVESTING AND CLEANING MACHINE.
APPLICATION FILED OCT. 3, 1916.
1,239,614.
Patented Sept. 11, 1917.
2 SHEETS—SHEET 2.
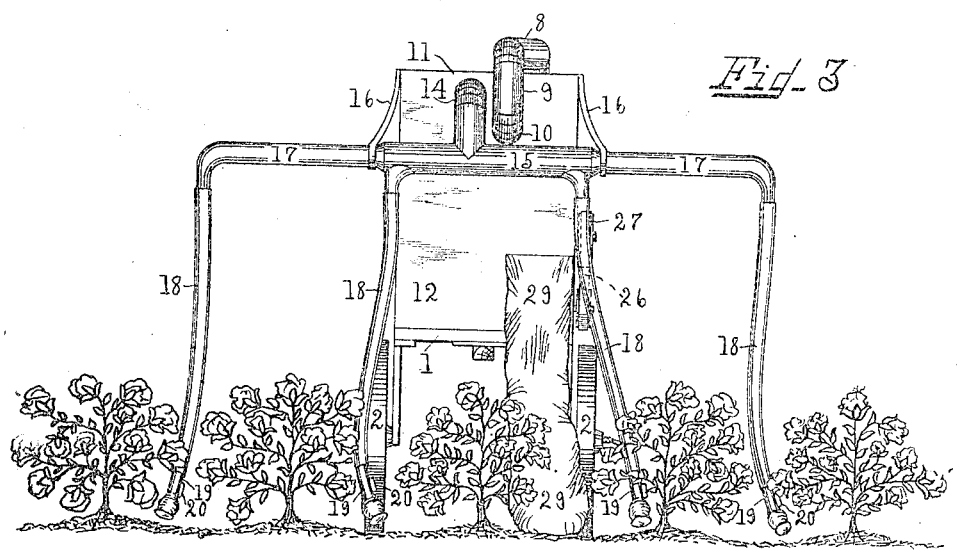
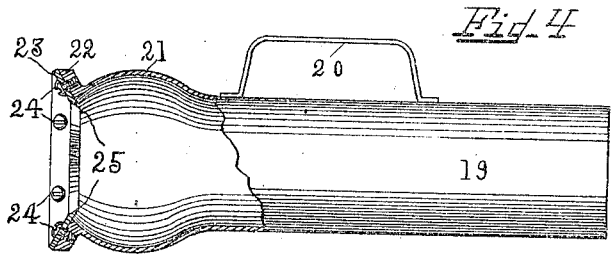
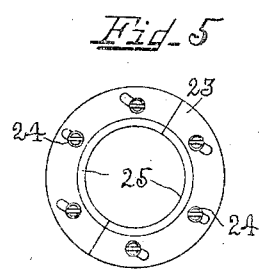

UNITED STATES PATENT OFFICE.

JOHN MEIER AND JAMES F. WALLACE, OF DALLAS, TEXAS.

COTTON HARVESTING AND CLEANING MACHINE.

1,239,614.  Specification of Letters Patent.  Patented Sept. 11, 1917.

Application filed October 3, 1916. Serial No. 123,495.

*To all whom it may concern:*

Be it known that we, JOHN MEIER and JAMES F. WALLACE, citizens of the United States, residing at Dallas, in the county of Dallas and State of Texas, have invented certain new and useful Improvements in Cotton Harvesting and Cleaning Machines, of which the following is a specification.

This invention relates to cotton harvesting and cleaning machines, and has for its object improvements in the machine heretofore patented to John Meier, No. 1,032,560, dated July 16, 1912, wherein devices are employed which the attendants present to the cotton plants to receive or gather either the open or boll cotton therefrom, whence it is conveyed by pneumatic action to a common receptacle. The said prior invention further consists in arranging the gathering devices referred to so that, in a measure, several attendants may be enabled to carry out the picking or gathering operations together or simultaneously. The present invention embodies similar but improved harvesting means and delivers the seed cotton, also boll-cotton into a separating and cleaning device carried along by the machine, where the hulls, husks, pods or other foreign matter, as the bolls, &c., are gathered, are at once separated from the cotton.

Another object of the invention is to provide a machine which is especially adapted, when drawn along the rows of growing plants, to gather the seed cotton that is easily separated from the hulls, or that may be on the ground, and also to pick the said matured bolls from the plants, crush the bolls and separate the cotton therefrom, the agencies employed in performing these functions of the present invention being both pneumatic and mechanical.

After the first heavy frost in the fall, there is, as a general thing a vast amount of boll cotton in matured condition remaining on the stalks in the fields. These bolls at this time of the year lose their opening power on account of becoming frozen; they have a good quality of cotton on their interior and it is, as a further object of this device to provide a machine by which all of the said remaining bolls may be quickly harvested, and as so gathered, the seed cotton extracted from them and rendered in a proper condition to be ginned.

An embodiment of this invention is disclosed in the structure illustrated in the accompanying drawings, wherein like characters of reference indicate corresponding parts in all the views, and in which, Figure 1 is a side elevation of a mechanism constructed in accordance with our invention; Fig. 2 is a plan view of the same; Fig. 3 is an end view of Fig. 1; Fig. 4 is an enlarged detail, partly in section of a picker nozzle; and Fig. 5 is an end view of the same.

Referring more particularly to the drawings, the various fixed instrumentalities herein described are mounted upon a vehicle-platform 1 supported by wheels 2 which are adapted to straddle either one or two rows of cotton according to the capacity of the machine, the wheels traveling between the rows. The vehicle may be drawn along the cotton rows by means of horse power or it may be propelled mechanically so that they provide means for securing a slow intermittent advance.

A suitable prime motor 3, preferably a gasolene engine as shown is mounted upon the platform 1. Said engine has a drive pulley 4, and a belt 5 forms the connection between it and a suction fan pulley 6, and by which the fan 7 located centrally on the platform 1 is driven. To the side of the fan 7 is connected an inlet conduit 8 that extends upwardly and rearwardly therefrom, terminating in a downward curve 9 that is connected at 10 to the upper portion 11 of a cotton extracting and cleaning device 12. Secured within the portion 11 and extending transversely across the same is a curved deflector 13 and the conduit bend 9 opens centrally beneath its concave portion as shown in Fig. 1. A conduit 14 connects with the chamber 11 above the deflector 13 and extends a short distance rearwardly and is then provided with an elbow making a quarter turn downward where it connects with a horizontal conduit section 15 disposed transverse with respect to the vehicle at either side thereof and is secured to the portion 11 by braces 16. At both ends of the section 15 are extended somewhat reduced sections 17 as shown, and two other similar extensions may be added to each end making four on each side in the case of machines of large gathering capacity. Connected to each of these gradually reduced sections 15 and 17, &c., are pendent flexible pipes or tubes 18 arranged in positions lying between the rows of cotton plants as shown in Fig. 3. Upon the lower extremity of each pipe 18 a suction cup or nozzle is secured, as is clearly shown in Figs. 4 and 5 and comprises a light metallic tube 19 provided at one of its sides with a suitable handle 20. The free end of the tube has formed thereon an enlarged head or chamber 21, the open end of which forms the entrance to the suction cup and is provided with a peripheral, outwardly extending flange 22, dished as shown and provided with screw receiving apertures. Correspondingly dished semi-circular knives 23 having elongated slots therein, are adapted, when placed together to have a diameter less than the diameter of the flange 22. Screws 24 are passed through the slots in the knives and engage the threaded holes in the flange and serve to securely hold the knives in proper position upon the device. The circular cutting edge 25 of the knives 23 extends entirely around the entrance of the cup and serves as a means whereby the operator, in picking the cotton, can, after the cup is placed over a cotton boll, cut the boll from the stem by imparting a lateral movement to the head.

The several picking nozzles on each side of the machine are each handled by an attendant who applies them in his discretion to such of the cotton-bolls as are ready for picking, thus causing most of the bolls to be pulled from their stems and drawn into the pipes by suction due to the fan. In case this suction alone is not sufficient to remove some of the bolls from the stems, the operator in moving a nozzle from one boll to another in any direction will cause the boll then held within it by the suction, to be clipped by the knife 23, thus making it possible to rapidly gather all of the matured cotton as the machine slowly moves forward to new positions. A belt 26 is driven by a pulley 27 secured to the engine shaft and imparts motion to a device indicated by 12 for removing the hulls and trash from the cotton gathered in the bolls, and said device may be of any of the well known types, with the addition of the air inlets and exits as herein shown.

The operation of our invention is as follows: The vehicle is caused to straddle a row of cotton, and the lateral conduits 17 then extend across several rows, depending upon the number of conduit sections. Between each row covered by the conduits an attendant walks, one for each suction tube, and with great rapidity and convenience presents a picker-nozzle to the bolls as they are reached in succession, picking the cotton off opposite sides of adjacent rows. The cotton as picked from the pod, or with the pod by the picking nozzle is carried through the tubes by the strong suctional blast and into the receptacle or separator 11 where it is separated from the suctional blast and drops into a cleaning device 12 disposed beneath and in communication with said receptacle which separates the cotton from the bolls, the current of air continuing around the deflector and out through the conduit 8 and thence through the fan exit 28, part of its passage being indicated by the darts. A bag or sack 29 is adapted to receive the seed cotton thus extracted, which is delivered by the machine in condition to be ginned. The cotton husks or pods may be dropped from the bottom of the separator 12 as removed from the cotton or they may be carried from said bottom by suction through the pipe 30 and discharged through the fan exit 28.

We have shown what is believed to be the preferable form of our invention. It will be obvious that modifications might be made, particularly in the crushing and cleaning mechanisms, the same being of course adapted to be accomplished in different ways which will be obvious to skilled mechanics.

Having thus set forth the object and nature of our invention and a form of apparatus embodying the same and having described the construction, function, and mode of operation thereof, what we claim as new and desire to secure by Letters Patent, is—

1. A cotton harvesting machine, comprising, in combination, a pneumatic cotton separating casing, a curved deflector within the casing, an exhaust conduit opening into the casing above the deflector and connected with a series of cotton picking nozzles, an exhaust conduit opening into the casing beneath the curved deflector and connected with an exhausting device, substantially as described.

2. A cotton harvesting machine, comprising in combination, a movable platform, a casing mounted on said platform, an exhausting device mounted on said platform, an exhaust conduit leading from the exhausting device to said casing, a deflector in said casing and arranged above said conduit, a conduit leading from the casing above the deflector and connected to a series of picking tubes, and means to operate the exhausting device, substantially as described.

In testimony whereof we affix our signatures in presence of two witnesses.

JOHN MEIER.
JAMES F. WALLACE.

Witnesses:
W. A. JEAN,
ELDA LUESLEY.